United States Patent
Guenther et al.

(10) Patent No.: US 11,475,555 B2
(45) Date of Patent: Oct. 18, 2022

(54) MOBILE INGREDIENT ANALYSIS SYSTEM, AND METHOD FOR TRUE-TO-SAMPLE MEASUREMENT AND USER GUIDANCE BY MEANS OF SAME

(71) Applicant: CARL ZEISS SPECTROSCOPY GMBH, Jena (DE)

(72) Inventors: Ralf-Peter Guenther, Jena (DE); Michael Rode, Jena (DE); Mario Krause, Jena (DE)

(73) Assignee: CARL ZEISS SPECTROSCOPY GMBH, Jena (DE)

( * ) Notice: Subject to any disclaimer, the term of this patent is extended or adjusted under 35 U.S.C. 154(b) by 290 days.

(21) Appl. No.: 16/755,669

(22) PCT Filed: Oct. 8, 2018

(86) PCT No.: PCT/EP2018/077249
§ 371 (c)(1),
(2) Date: Apr. 13, 2020

(87) PCT Pub. No.: WO2019/072729
PCT Pub. Date: Apr. 18, 2019

(65) Prior Publication Data
US 2021/0366091 A1    Nov. 25, 2021

(30) Foreign Application Priority Data

Oct. 11, 2017  (DE) ...................... 10 2017 123 646.5
Feb. 16, 2018  (DE) ...................... 10 2018 103 509.8

(51) Int. Cl.
*H04N 5/225*    (2006.01)
*G06K 9/20*     (2006.01)
(Continued)

(52) U.S. Cl.
CPC ............. *G06T 7/001* (2013.01); *G01N 21/31* (2013.01); *G06F 3/14* (2013.01); *G06V 10/12* (2022.01);
(Continued)

(58) Field of Classification Search
CPC ........ G01J 3/027; G01J 3/0264; G01J 3/0297; G01J 3/0256; G01J 3/0272; G01J 3/0291;
(Continued)

(56) References Cited

U.S. PATENT DOCUMENTS 6,360,179 B1    3/2002  Reep
7,428,042 B2 *  9/2008  Ghiraldi ............... G01N 21/276
                                                    356/73
(Continued)

FOREIGN PATENT DOCUMENTS

DE  102004048103   4/2006
EP  1956361        8/2008

*Primary Examiner* — Sang H Nguyen
(74) *Attorney, Agent, or Firm* — Stuart H. Mayer; Mayer & Williams PC (57) ABSTRACT

A method for true-to-sample measurement by a mobile ingredient analysis system having a housing with a window, an interface for an external reference unit, a display and operating unit, a light source, an optical spectrometer, a camera, an internal reference unit, and an electronic control unit. The method includes: selecting a calibration product suitable for a sample to be examined; performing a plausibility check of the calibration product, an incorrect selection being signaled and an alternative calibration product being selected; outputting measurement conditions comprising the measurement point to be selected and measurement duration for the selected calibration product; capturing measured values of the sample by the spectrometer under the measurement conditions and with simultaneous monitoring of the measurement conditions; processing the captured measured values by means of an electronic control unit, each (Continued)

measured value captured while the measurement conditions were met being declared valid; outputting the measured values deemed valid.

11 Claims, 3 Drawing Sheets

(51) Int. Cl.
    *G01N 21/31*         (2006.01)
    *G06T 7/00*          (2017.01)
    *G06F 3/14*          (2006.01)
    *G06V 10/12*        (2022.01)
    *G06V 10/143*       (2022.01)

(52) U.S. Cl.
    CPC ......... *G06V 10/143* (2022.01); *H04N 5/2252* (2013.01); *H04N 5/2256* (2013.01); *G01N 2201/0634* (2013.01); *G06T 2207/30128* (2013.01)

(58) Field of Classification Search
    CPC ........ G01J 2003/283; G01J 2003/2836; G06T 7/001; G06T 2207/30128; H04N 5/2252; H04N 5/2256; A01D 43/085; A01D 41/1277; G06V 10/143; G06V 10/12; G06F 3/14; G01N 21/4785; G01N 21/274; G01N 21/31; G01N 21/3563; G01N 21/278; G01N 21/359; G01N 2201/0238; G01N 2201/0634; G01N 2201/12707; G01N 2201/1214; G01N 2201/0221
    See application file for complete search history.

(56) References Cited

U.S. PATENT DOCUMENTS

| | | | |
|---|---|---|---|
| 8,964,180 B2* | 2/2015 | Pellenc | G01N 21/474 356/402 |
| 2006/0093522 A1* | 5/2006 | Kormann | G01N 21/474 422/82.05 |
| 2008/0137087 A1* | 6/2008 | Greten | G01N 21/359 702/81 |
| 2008/0186487 A1* | 8/2008 | Kormann | A01D 41/1277 356/328 |
| 2014/0027641 A1* | 1/2014 | Mucci | G01N 21/3577 250/339.07 |
| 2015/0021478 A1* | 1/2015 | Lee | G01N 33/025 250/338.4 |
| 2015/0204833 A1* | 7/2015 | O'Brien | G01J 3/0216 250/339.01 |

* cited by examiner

MOBILE INGREDIENT ANALYSIS SYSTEM, AND METHOD FOR TRUE-TO-SAMPLE MEASUREMENT AND USER GUIDANCE BY MEANS OF SAME

BACKGROUND OF THE INVENTION

The present invention relates to a method for sample-appropriate measurement and user guidance for a mobile constituent analysis system, in particular a hand-held constituent analysis system, and to a mobile constituent analysis system based on spectroscopy. A preferred field of application of the method is the constituent analysis of agricultural products. In the case of cereals, for example, the moisture content and the protein or starch content should be recorded for quality and/or maturity analysis. The method can be used, e.g., in field operations, where sample presentation and sample illumination are not able to be exactly defined and differently qualified users act as operators.

EP 1 956 361 B1 discloses a measuring device for the optical and spectroscopic examination of a sample. The measuring device comprises a housing with a window attached in a wall of the housing. A first light source is disposed in the housing, the light of which can fall through the window onto a sample that is disposed outside the housing. Furthermore, an optical spectrometer with a dispersive element and a plurality of detector elements is situated in the housing, said optical spectrometer being able to absorb light from the first light source that has been indirectly reflected by the sample and re-enters the housing through the window. Moreover, an electronic camera is disposed in the housing, the incidence opening of which is directed through the window onto the sample. A second light source disposed in the housing is assigned to the camera in such a way that light from the second light source can be incident on the sample through the window. The camera is positioned in such a way that it can record light from the second light source that was indirectly reflected from the sample and re-enters the housing through the window. An electronic evaluation unit is connected to an image sensor of the camera and the detector elements. In addition to parameters of the sample, such as, e.g., starch and water content, the electronic evaluation unit can determine, inter alia, the length of particles in the sample and the proportion of impurities by virtue of evaluating a plurality of images of the camera that were recorded successively in time. The measuring device can be attached to a self-propelled harvester, with the sample stream being guided past the measuring device.

DE 11 2014 002 923 T5 describes a portable moisture measuring device for determining the moisture content in biological material such as animal feed, for example. The device contains a main element, which comprises a display device, an operating element and a power source, and a control device for communicating with the display device and the operating element. A handle is connected to the main element. A first end of a rod is connected to the main element. The moisture measuring device furthermore comprises a sensor device for measuring moisture values, which is mechanically connected to a second end of the rod and electrically connected to the control device. The sensor device contains a near-infrared sensor.

U.S. Pat. No. 8,964,180 B2 discloses a portable and self-contained optical spectrometer for analyzing a light spectrum scattered back from an illuminated sample. The spectrometer is disposed around an optical axis and comprises a target region which is centered on the optical axis, a plurality of optical sensors, an opaque measuring chamber with an opening that is centered on the optical axis and blocked by at least one diffusion filter, and with one inner base for holding the optical sensors. A main illumination device is used for illuminating the sample.

US 2015/0021478 A1 shows a non-destructive, portable sugar content measuring apparatus for measuring the sugar content of fresh foodstuff such as fruits. The apparatus comprises, inter alia, an LED light source with LEDs disposed in a circle, said LEDs emitting light at a wavelength optimized for sugar, a spectral sensor and a temperature sensor. An adaptation to the sample to be measured in each case can be made via a device-integrated menu-driven user interface.

US 2015/0026298 A1 describes a method for selecting the most likely variant of a suitable candidate color standard for vehicle repair. The method uses a mobile apparatus with a color display and an input unit, which is connected to a central data processing unit via a wireless communication line. Visual differences between a selected candidate color standard and identified variants of the selected candidate color state can be shown on the display of the mobile device.

US 2015/0204833 A1 shows a method and an apparatus for field-spectroscopic characterization of fruits de mer. A portable NIR spectrometer is connected to an analyzer that is configured to perform multivariate pattern recognition analysis of reflection spectra to qualitatively determine the true identities of fruits de mer or quantitatively determine the freshness thereof.

WO 2008/076878 A1 describes a probe head for optical spectroscopic measurements. The probe head comprises an illumination source for illuminating a sample, a converging optical unit for observing the sample and an internal reference disposed between the illumination source and converging optical unit. A movable calibration mirror can be repositioned between a measurement position, in which the converging optical unit observes the sample, and a calibration position, in which the converging optical unit observes the internal reference.

WO 2014/004948 A1 has disclosed a hand-held infrared spectroscopy device, which can preferably be connected to a mobile phone, a smartphone, a tablet or a computer. A liquid sample port inside the device facilitates an infrared spectral analysis of liquid samples.

WO 2014/008023 A1 considers the marking of reference materials that are of interest for spectroscopic search applications. A reference list of materials that should be considered to be part of a final analysis of a spectroscopic analysis of a sample material is generated. An observation list of at least one material that should be retained for a final analysis of the spectroscopic analysis of a sample material is provided. There is a final analysis of the sample material using the observation list of the at least one material and the reference list of materials. Whether a spectrum of the sample material corresponds to at least one material spectrum on the observation list and on the reference list is subsequently determined.

WO 2015/101992 A2 contains a hand-held spectrometer that can be coupled to a database with spectral information for the purposes of determining attributes of an object. The spectrometer can be coupled to a portable communications apparatus, by means of which the user can enter and receive data that relate to the measurement object.

US 2004/169857 A1 discloses a ceramic reference and a method for generating a reference signal, including the following steps: providing a spectrometer having a source that emits incident photons; providing a ceramic element having an incident surface and an internal scattering body; directing at least a portion of the incident photons toward the incident surface; scattering said portion of the incident photons by the ceramic; detecting at least a portion of the scattered photons, wherein the reference signal is generated.

EP 1 740 928 B1 contains a method for recalibrating a spectrometric probe head, which uses internal and external referencings that can be pivoted into the beam path of the probe head.

The previously known mobile constituent analysis systems generally have a simple design and are disadvantageous in that the measurement accuracy required for moisture and constituents, such as protein and starch, cannot be ensured on account of the degrees of freedom in the measurement. In addition to the sample presentation, there are other influencing factors on the measurement accuracy, which depend on the illumination and the position and structure of the sample, for example. The minimum requirements are a standard deviation of <0.4% for a moisture measurement, <0.3% for protein and <0.5% for starch. Established calibrations have different levels of robustness in relation to sample tolerances and environmental conditions. If more than one year of data about the sample to be measured is available, the calibration should have a certain robustness or confidence interval. However, when the limit of the confidence interval is approached, issuing a warning to the user may be useful. Different relative humidities during the sample measurement can also influence the measurement result.

SUMMARY OF THE INVENTION

Proceeding from the prior art, the object of the present invention is to provide a method for sample-appropriate measurement and user guidance for a mobile constituent analysis system, which enables a reproducible constituent measurement, in particular in field operations, by differently qualified users. The method should always enable a reliable constituent analysis automatically and without subjective or judgmental influence by the user. Furthermore, a mobile constituent analysis system for carrying out this method should be provided.

A method as claimed in claim 1, a mobile constituent analysis system as claimed in claim 8 and a data processing program as claimed in claim 10 are used to achieve the object.

Figure 3:
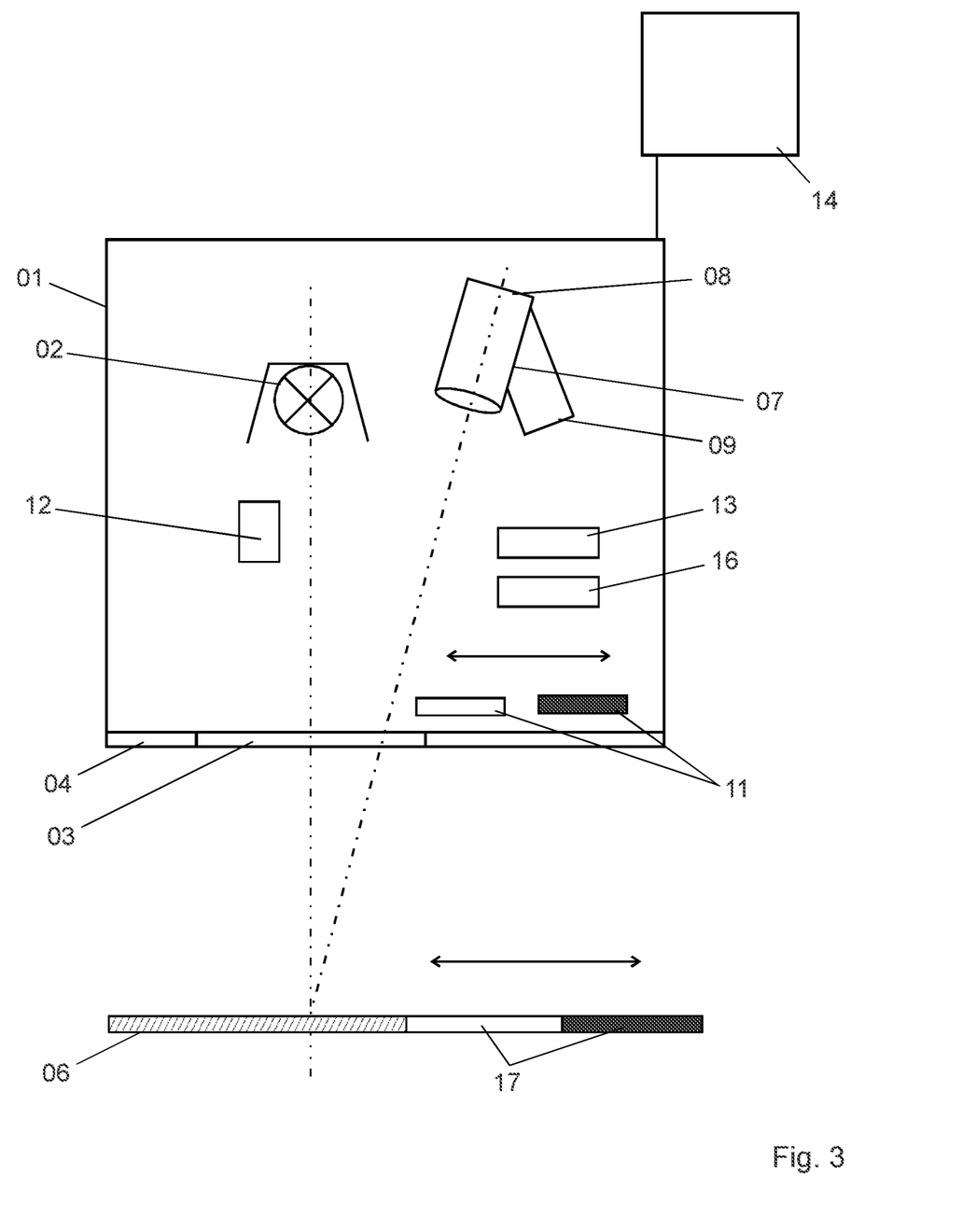
FIG. 3: shows a constituent analysis system according to the invention.

The method according to the invention as shown in FIG. 3 controls a mobile constituent analysis system, which comprises a housing (01) with a window (03) disposed in a wall (4) of the housing. A light source (02), an optical spectrometer (07), a camera (12), an internal reference unit (11) for referencing and an electronic computing or control unit (13) are disposed within the housing (01). The components are controlled by the control unit (13), which is formed by a microprocessor, for example. Light from the light source (02) is emitted through the window of the housing in the direction of a sample (06) to be examined. The optical spectrometer (07) preferably comprises a dispersive element (08) and a plurality of spectral sensors (09) which can record the light reflected by the sample (06). The incidence opening of the camera (12) is also directed onto the sample through the window. The camera (12) is preferably assigned a second light source, for example in the form of a white light LED, which emits light through the window onto the sample. The light of the second light source reflected by the sample is captured by the camera. For external referencing, the constituent analysis system further comprises an interface (16) for connection to an external reference unit (17) and a display and operating unit (14) for interaction with a user. For intuitive interaction with a user, the display and operating unit (14) preferably comprises a graphical user interface (16) (GUI) with good resolution. Consequently, sample images are also displayable in high quality. However, simple displays or multifunctional operating elements can also be used. An internal storage facility for the data records, including the sample images, is advantageous in such systems, which data records can be read out later and can be used to create logs of the measurements and measurement series. Being able to display a validity statement in addition to the measurement value of the constituent is essential in this case. Moreover, further operating and display elements, such as operating panels, operating buttons and operating switches, and optical or acoustic indication elements can be present. Furthermore, the constituent analysis system can contain an interface (16), such as USB, Bluetooth, Wi-Fi or similar interfaces (16), for data input and output. Software updates for the control unit, updates for the calibration products or new calibration products can be imported via the interface (16). Moreover, the storage of measurement data on external data media and the output thereof on a printer is facilitated.

The method carried out by the constituent analysis system comprises the following steps: In a first step, a calibration product suitable for the present sample to be examined is selected, preferably in automated fashion on the basis of a recorded image or by virtue of a user making an entry on the display and operating unit (14) or confirming an automatic pre-selection. A calibration product within the meaning of the invention is a measurement and evaluation regime stored in a memory of the electronic control unit, which calculates one or more constituents of the examined sample on the basis of a calibration model, likewise stored in the memory, and further processes for recording measurement values in sample-appropriate fashion contained in the memory, such as measurement points, measurement duration, referencing, reflection spectra captured by means of a spectrometer.

In a further method step, the plausibility of the chosen calibration product is checked automatically. Should the chosen calibration product not match the sample within predetermined tolerance ranges, this is signaled to the user on the display and operating unit. Preferably, to this end, the camera captures an image of the sample and an image recognition routine compares said captured image to stored images. If necessary, the user is requested to select an alternative calibration product, which in turn is subjected to a plausibility check. Alternatively, another calibration product can be chosen automatically. The aforementioned steps are carried out until the plausibility check of the calibration product leads to a positive result or the method has to be stopped completely after a predetermined number of tests if no suitable calibration product is found. This allows measurement errors due to incorrectly selected calibration products to be eliminated. There preferably is the option of an automatic or user-guided creation of a new calibration product in the event of no suitable calibration product being found.

An automatic and/or user-guided capture of measurement values using the optical spectrometer follows in the next step. To this end, measurement conditions adapted to the chosen or automatically determined calibration product are output or displayed for the user; i.e., the latter is provided with information that comprises at least the measurement point to be chosen and the measurement duration. By way of example, the duration of the measurement sequence is signaled to the user via the display unit. Hence, the user knows how long they have to keep the constituent analysis system at rest and in secure and unchanging contact with the sample in order to be able to carry out an optimal measurement. The previously selected calibration product preferably specifies whether individual measurements or cyclical measurements should be carried out. The number of individual measurements is preferably also set with reference to the calibration product. During the individual measurements, it is preferably signaled to the user when they should change the measurement location and take another individual measurement. When recording the measurement values, the user is preferably guided by optical signals, such as, e.g., LED displays, or by acoustic signals. Consequently, measurement values are recorded under the previously determined measurement conditions.

The captured measurement values are subsequently processed by the electronic control unit, with each measurement value being subjected to a plausibility check on the basis of stored comparison values. Here, the plausibility check comprises at least the check whether the respective measurement value was recorded under the set and previously output measurement conditions. To this end, the measurement conditions are monitored while the measurement values are recorded. The plausibility check can also comprise the comparison with tolerance ranges or expected values and optionally further checks. Measurement values that do not pass this plausibility check are marked as invalid.

Finally, at least the measurement values marked as valid, but optionally all captured measurement values, are output on the display and operating unit, to a data medium, to a printer or to another output unit. Here, a validity statement is output for each measurement value or applied in the form of a filter. In the event of warnings, for example due to excessive deviations between the individual measurements, a fully automatic decision can be made as to whether certain individual measurements should not be included in the calculation. This decision can also be left to the user in modified versions. Whether incorrect individual measurements should be eliminated manually, semi-automatically or fully automatically can preferably be set in the configuration of the calibration product.

A substantial advantage of the method according to the invention is that a high degree of reproducibility of manual measurements can be achieved through the automated procedure, possibly supported by the integrated user guidance, and through the plausibility check. In this way, reproducible constituent measurement values can be made available, particularly during the field operation as well. Measurement errors and undesirable influences on the measurement result can be largely excluded. The user guidance facilitates an optimal recording of measurement values for trained calibrators, feed consultants and logistics workers or farmers on site. Reproducible measurement values are of great importance in the agricultural products sector since the measurement values generally influence subsequent processes, such as an incoming goods inspection with assurance of certain quality characteristics; this can also have monetary effects.

According to an advantageous embodiment, there is an internal calibration of the constituent analysis system with the aid of the internal reference unit prior to the recording of the measurement values. External referencing, for the purposes of which the interface to an external reference unit is provided, is preferably used to calibrate the constituent analysis system prior to use or at certain time intervals. For details relating to the calibration, reference is made to the aforementioned patent EP 1 740 928 B1 of the applicant.

The internal and external referencing preferably comprise black and white standards, which can be supplemented by additional application-specific internal standards for more in-depth calibrations. The standards are preferably controlled automatically. However, a manual control is likewise possible. The internal and external referencing facilitate automatic system monitoring, monitoring of the window for damage or contamination and the option of using different window materials or sample containers (Petri dish, beaker, bottle) without having to modify or adapt the existing calibrations. After the measurement data have been captured with the internal referencing by the spectrometer, there subsequently is an internal calibration of the constituent analysis system using the measurement values from the calibration of the constituent analysis system prior to use. The constituent analysis system is now ready for the next measurement of the sample.

For the plausibility check of the calibration product or during the plausibility check of the captured measurement values, use can preferably be made of images of the sample recorded by the camera and of comparison images for the chosen calibration product that are stored in a memory of the electronic computing unit for the selected calibration product. The electronic control unit compares the recorded images of the sample with the stored comparison images, e.g., using an image recognition software. Depending on the analysis of the sample image, the following values are recorded and the listed events are triggered:

a) The sample image is intrinsically homogeneous and has a uniformly distributed brightness. A reference measurement with an external wavelength standard is available.

Spectrometer full saturation at a wavelength of approximately 1200 nm (peak of the halogen lamp) means referencing with an external white standard if the spectral curve is continuous (no peaks). The full saturation takes place at a minimum possible integration time (stored at factory acceptance). This is a measurement with an external wavelength standard if no continuous spectral curve is identifiable and if there are peaks/dips/characteristic bands at stored points in the spectrum.

Spectrometer full saturation with minimum integration time multiplied by a fixed factor x in % at a wavelength of approximately 1200 nm means a measurement with a grayscale standard set for checking the linearity of the measuring system.

Spectrometer saturation below a minimum value→insufficient reflection→no sample—invalid measurement b) The sample image provides an uneven brightness distribution with an area-by-area distribution.

No complete coverage of the measurement window with sample material→measurement value invalid or warning c) The sample image provides an uneven distribution of brightness with a homogeneous distribution of light/dark regions.

Assessment of sample compression→insufficient sample compression (for grain samples)→measurement invalid Assessment of the structure and granularity of the sample, for example coarse-grained for maize or fine-grained for wheat→suitable for the selected calibration product, measurement value valid or warning For the purposes of assessing the sample compression, there preferably is a comparison with reference images stored for the individual calibration products in order to output a warning or an invalidity of the measurement in the case of an insufficient sample compression.

Alternatively, a photodiode can be used for the plausibility check of the calibration product or during the plausibility check of the captured measurement values, said photodiode integrally assessing the visual reflection spectrum of the sample and being able to provide a statement on the quality of the measurement.

Furthermore, a check can be carried out with the aid of the sample images recorded by the camera as to whether individual measurements that should have been made at different measurement locations were in fact measured at different measurement locations. To this end, an image of the respective measurement location is recorded by means of the camera. The recorded measurement location images are subsequently compared using the image recognition software in order to identify different measurement locations.

The images of the sample recorded by the camera can also be used to check, inter alia, whether an optimal measurement distance has been maintained or whether the constituent analysis system exerted an optimal contact pressure on the sample during the measurement. The specifications for the measurement distance and the contact pressure are stored in relation to the appropriately chosen calibration product.

Using the data of a position sensor integrated in the constituent analysis system for the plausibility check was found to be expedient. The position sensor can be, for example, a 3-axis sensor, acceleration sensor, gravity sensor or gyro sensor. The light source used according to the method is preferably embodied as broadband thermal illumination, such as an IR emitter or halogen lamp, for example. It is known from such light sources that they only rarely emit homogeneously and that the centroid of the light emergence can migrate along their filament or can form at a different point of the filament during each switch-on process. When carrying out a measurement with a mobile constituent analysis system, the user can carry out the measurement without any restrictions on the relative orientation in space. Here, it was found to be expedient if the internal calibration takes place in the same relative position as the sample measurement. The position sensor detects the relative position of the constituent analysis system in relation to the measurement location during the internal calibration and the actual recording of the measurement values. The internal calibration is only considered valid if the orientation/relative position during measurement and internal calibration match; otherwise, a new internal calibration is requested or carried out automatically. In the event that there are correction data with respect to the illumination for the orientation/relative position of the constituent analysis system in space, these are included depending on the relative position.

It was found to be advantageous if vibrations of the constituent analysis system are captured, at least when recording the measurement values. To this end, the constituent analysis system is preferably equipped with a shock sensor.

The positioning accuracy of the standards used for the internal calibration has a great influence on the measurement accuracy. In the event that the shock sensor captures a shock or impact during the measurement sequence, the measurement is preferably automatically discarded and a new internal calibration and measurement are triggered.

Mobile measuring devices have an ever-present risk of falling due to being dropped, of tipping over or of being placed roughly, and shock risks from transport. In the spectrometer, the factory calibration of the wavelength correctness<1 nm is of crucial importance for the trustworthiness of the measurement values and hence for the constituent calculation for the examined samples. The specified shock sensor registers strong shocks during operation, i.e., when the constituent analysis system is activated, and instructs the user to check whether the wavelength is correct. By way of example, this can be implemented by way of a check in relation to the external wavelength standard and by means of stored reference values. In this context, reference is made to DE 10 2007 029 405 A1, in which a wavelength standard and an intensity standard for spectrometers are described. If deviations that exceed a confidence interval are found, the user is advised to send the device back to the manufacturer for recalibration purposes or the system is automatically deactivated until the next calibration.

According to a particularly preferred embodiment, the shock sensor also works when the constituent analysis system is deactivated and said shock sensor is supplied internally with electrical power by a buffer battery or storage capacity. In this way, even shock events occurring outside of operation, for example during transport, can be recorded. In the event where excessive vibrations were captured by means of the shock sensor, a user warning to check whether the wavelength is correct is preferably output when the device is activated.

It is known from practice that calibrations only supply plausible measurement values within a certain confidence interval. For this reason, it was found to be advantageous to capture the measurement location temperature when recording measurement values. To this end, the constituent analysis system is preferably equipped with temperature sensors. There is a comparison between the temperatures captured by the temperature sensors and validity temperature values specified in relation to the selected calibration product. Inadmissible deviations from the specified validity temperature values are signaled by the display and operating unit. The captured measurement location temperatures are preferably stored together with the raw data of the spectrum and are consequently also available for later evaluations. The housing internal temperature of the constituent analysis system is preferably also captured. This is advantageous since the NIR detectors installed in hand-held devices are usually uncooled or not temperature-stabilized. Changes in temperature consequently change the dark noise of the detector. This possible influence on the measurement result is therefore captured and accordingly signaled to the user or automatically taken into account by the control unit. Preferably, a new internal calibration is requested or triggered automatically.

Furthermore, it was found to be expedient to capture the relative humidity in the housing of the constituent analysis system and at the measurement location when recording measurement values. To this end, a moisture sensor is preferably in each case disposed within the housing and at the measurement location. Capturing the relative humidity in the housing primarily serves to protect the device. By capturing the relative humidity at the measurement location, it is possible to identify, for example, whether there is water vapor in the environment and corresponding measurement value corrections have to be made. This can minimize measurement errors caused by humidity. Furthermore, sensors for an air pressure measurement and a distance measurement can be used; for the purposes of measuring the distance to the sample, use can be made of methods that are already known, such as, e.g., ultrasonic measurement, time-of-flight measurement or optical distance measurement.

The method can be used to ensure a sample-appropriate measurement in mobile constituent analysis systems since the usual sources of error can be eliminated, or at least minimized, by appropriate countermeasures.

The data processing program according to the invention comprises program code means for carrying out the described method in the electronic control unit of the mobile constituent analysis system.

BRIEF DESCRIPTION OF THE DRAWINGS

Preferred embodiments of the invention are explained in more detail below with reference to the attached figures. In the figures.

DETAILED DESCRIPTION OF THE INVENTION

Figure 1:
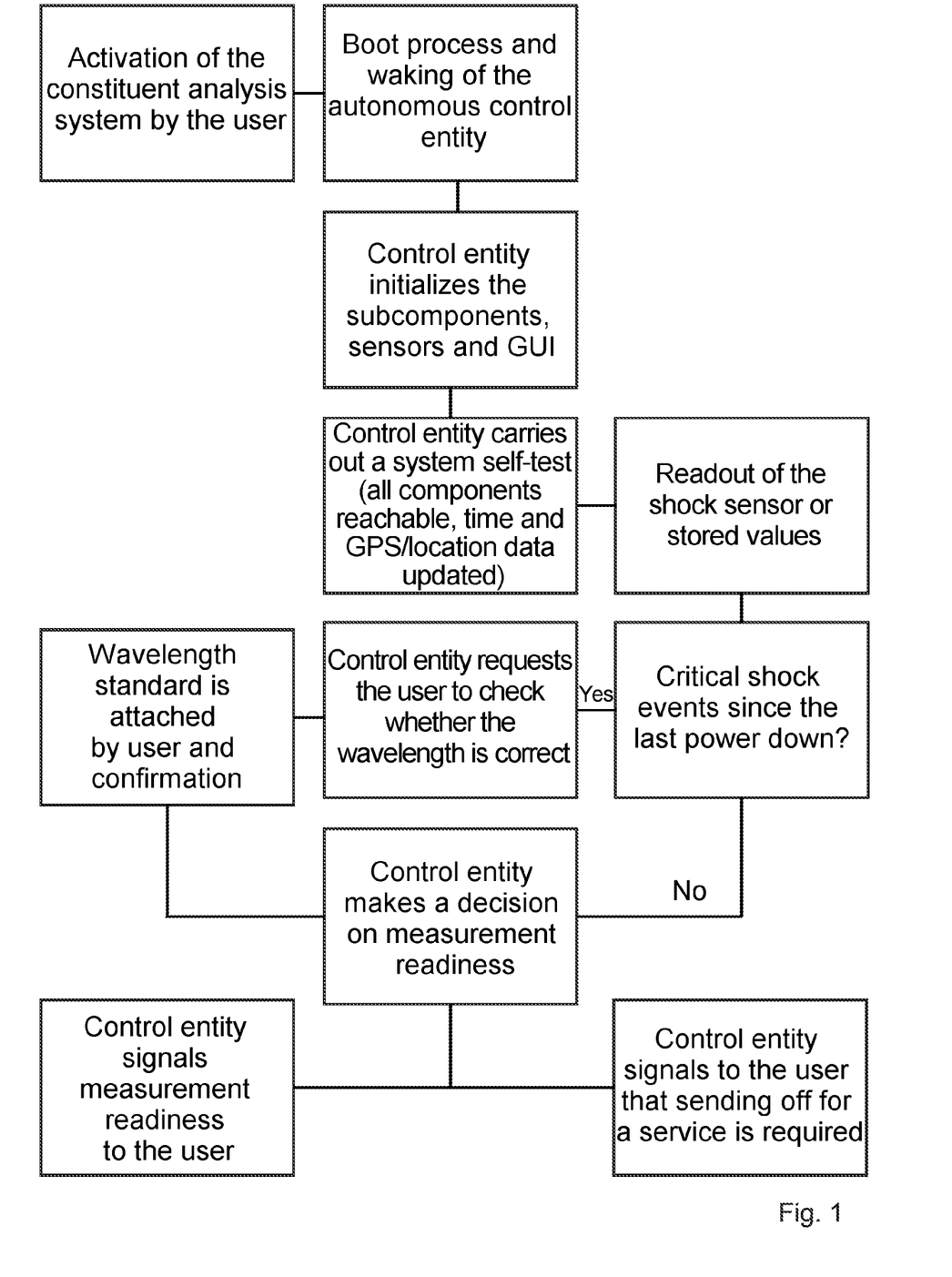
FIG. 1: shows a program flowchart of a method according to the invention.
Figure 2:
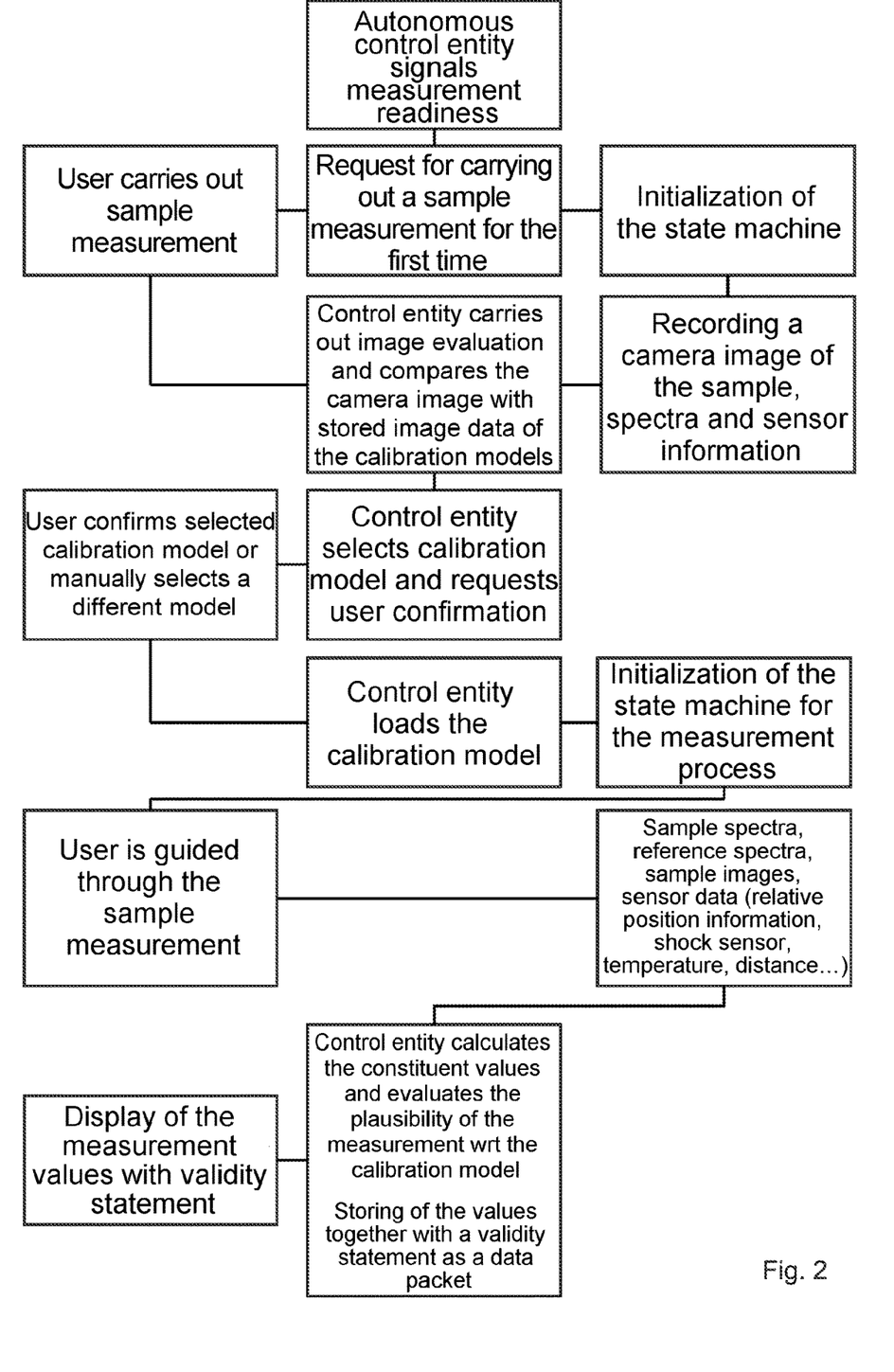
FIG. 2: shows the continuation of the program flowchart according to FIG. 1.

Together, FIGS. 1 and 2 show an associated program flowchart of a method according to the invention, which controls a mobile constituent analysis system. The constituent analysis system, which is designed to carry out the method, comprises a housing with a window. A light source, an optical spectrometer, a camera, an internal reference unit for referencing and an electronic computing or control unit are disposed within the housing. The components are controlled by the control unit. The control unit acts as an autonomous control entity and monitors the processes. A state machine, which carries out the spectroscopic measurements, the ascertainment of the constituents and the plausibility check, is a constituent part of the control unit. The constituent analysis system furthermore contains a display and operating unit for interacting with a user, which is preferably embodied as a graphical user interface (GUI). Furthermore, the system preferably comprises a plurality of sensors for capturing various operating parameters, for example a position sensor, a shock sensor, a temperature sensor or a moisture sensor.

The processes running during the method are described below with reference to FIGS. 1 and 2. In a first step, the constituent analysis system is activated by the user. A boot process takes place. The autonomous control entity starts and initializes the subcomponents, the sensors and the display and operating unit (GUI). The control entity carries out a system self-test, in which a check is carried out as to whether all components can be reached and whether the time in the system and the GPS/location data are current. The data captured by the shock sensor are checked. If the check shows that a critical shock event has occurred since the last use, the control entity automatically requests the user to check whether the wavelength is correct. The user attaches an external wavelength standard and confirms this procedure. A check against the wavelength standard using stored reference values is carried out. If deviations that exceed a confidence interval are found, the control entity decides that measurement readiness is not present. It is signaled to the user that service work must be carried out. In the event that no critical shock event has been detected, the control entity immediately decides whether the constituent analysis system is ready to measure. If measurement readiness is present (continued procedure, see FIG. 2), the user is requested to carry out a sample measurement for the first time. The state machine is initialized and causes a camera image of the sample, the spectra and the sensor information to be recorded. The control entity subsequently carries out an image evaluation by virtue of comparing the camera image recorded by the sample with image data of calibration models stored in a memory of the control unit. As a result of this comparison, the appropriate calibration model is automatically selected by the control entity. The user is requested to confirm the selected calibration model. However, they also have the option of manually selecting a different calibration model. Subsequently, the control entity loads the calibration model chosen by the user or the automatically chosen calibration model. The state machine is initialized for the measurement process. The user is guided through the sample measurement. The captured measurement values are processed by the control unit. Sample spectra, reference spectra, sample images and sensor data are recorded and processed. The control entity calculates the constituent values and evaluates the plausibility of the measurement with respect to the chosen calibration model. The constituent values are stored together with a validity statement as a data packet. Finally, the measurement values are output with the associated validity statement on the display and operating unit or on a printer.

The invention claimed is:

1. A method for sample-appropriate measurement using a mobile constituent analysis system comprising a housing with a window, an interface for an external connection and a display and operating unit, wherein a light source, an optical spectrometer, a camera, an internal reference unit and an electronic control unit are arranged in the housing, wherein the method comprises the following steps:
    selecting a calibration product suitable for a sample to be examined, the calibration product is a measurement and evaluation regime stored in a memory of the electronic control unit, which calculates one or more constituents of the examined sample on a basis of a calibration model stored in the memory, and further processes for recording measurement values in sample-appropriate fashion contained in the memory;
    checking the plausibility of the chosen calibration product, wherein for the plausibility check of the chosen calibration product, images of the sample taken by the camera are compared with comparison images stored in a memory of the control unit for the selected calibration product, an incorrect selection being signaled and a renewed selection of an alternative calibration product being initiated if the chosen calibration product does not match the sample within predetermined tolerance ranges;
    outputting measurement conditions to be observed, which comprise at least the measurement point to be chosen and the measurement duration, depending on the selected calibration product;
    capturing measurement values at the sample using the spectrometer under the measurement conditions and whilst simultaneously monitoring the measurement conditions;
    processing the captured measurement values by the electronic control unit, wherein each measurement value that has been recorded in compliance with the measurement conditions is declared valid;
    outputting at least the measurement values found to be valid to the display and operating unit or another output or storage element.

2. The method as claimed in claim 1, wherein an internal calibration of the constituent analysis system is carried out with the aid of the internal reference unit prior to the recording of the measurement values.

3. The method as claimed in claim 1, wherein the alignment of the constituent analysis system in relation to the measurement location is captured and monitored during the capture of the measurement values.

4. The method as claimed in claim 1, wherein vibrations of the constituent analysis system are captured and monitored, at least while the measurement values are being recorded.

5. The method as claimed in claim 1, wherein the temperature and the relative humidity at the measurement location and in the interior of the housing are captured and monitored while the measurement values are being recorded, with impermissible deviations from temperature values and relative humidities specified by the calibration product being signaled by the display and operating unit.

6. The method as claimed in claim 1, wherein whether the measurement conditions are met while the measurement values are being recorded is signaled to the user by optical or acoustic signals.

7. The method as claimed in claim 1, wherein another calibration product is chosen automatically in the event of a negative result of the plausibility check of the chosen calibration product, said other calibration product, in turn, being subjected to a plausibility check.

8. A mobile constituent analysis system, comprising
a housing;
a light source disposed in the housing;
a window disposed in a wall of the housing, light being emitted from the light source in the direction of a sample through said window;
an optical spectrometer disposed in the housing, comprising a dispersive element and a plurality of spectral sensors and being able to detect the light reflected by the sample;
an internal reference unit disposed in the housing;
a camera disposed in the housing, the incidence opening of which is directed through the window in the direction of a sample to be examined;
an electronic control unit disposed in the housing;
a display and operating unit for interaction with a user;
an interface for an external connection;
wherein the control unit is configured to carry out a method as claimed in claim 1.

9. The mobile constituent analysis system as claimed in claim 8, further comprising at least one of the sensors listed below:
a relative position sensor for capturing the alignment of the constituent analysis system;
a shock sensor for capturing vibrations in the constituent analysis system;
a temperature sensor for capturing the measurement location temperature;
a temperature sensor for capturing the internal housing temperature;
a humidity sensor for capturing the relative humidity at the measurement location and inside the housing.

10. A data processing program comprising program code in the electronic control unit of the mobile constituent analysis system according to claim 9.

11. A data processing program comprising program code in the electronic control unit of the mobile constituent analysis system according to claim 8.

* * * * *